Dec. 1, 1964 C. W. UPCHURCH 3,158,946
SPINNING HUB CAP
Filed May 25, 1962 2 Sheets-Sheet 1
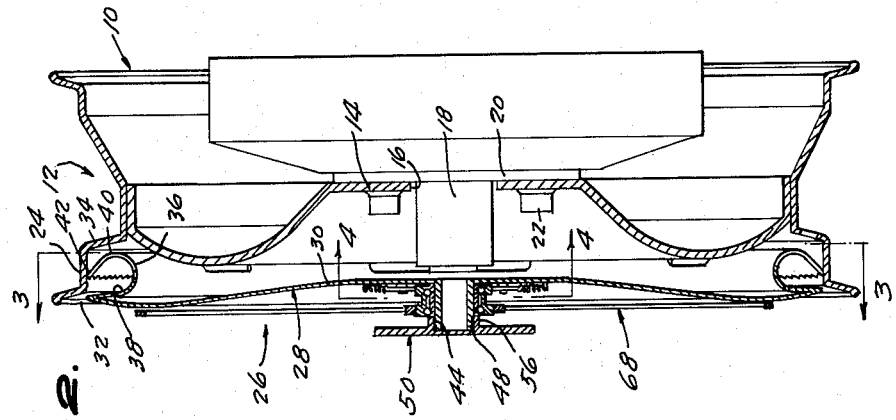
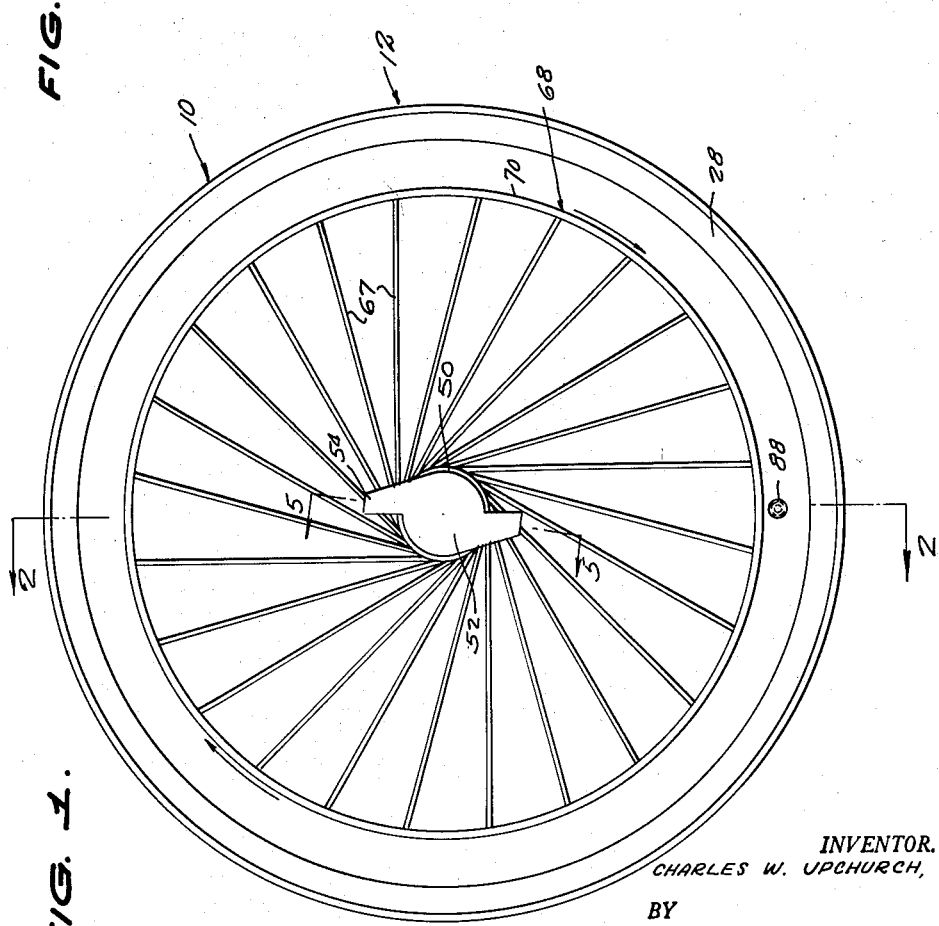
INVENTOR.
CHARLES W. UPCHURCH,
BY
McMorrow, Berman & Davidson
ATTORNEYS.

Dec. 1, 1964 C. W. UPCHURCH 3,158,946
SPINNING HUB CAP
Filed May 25, 1962 2 Sheets-Sheet 2
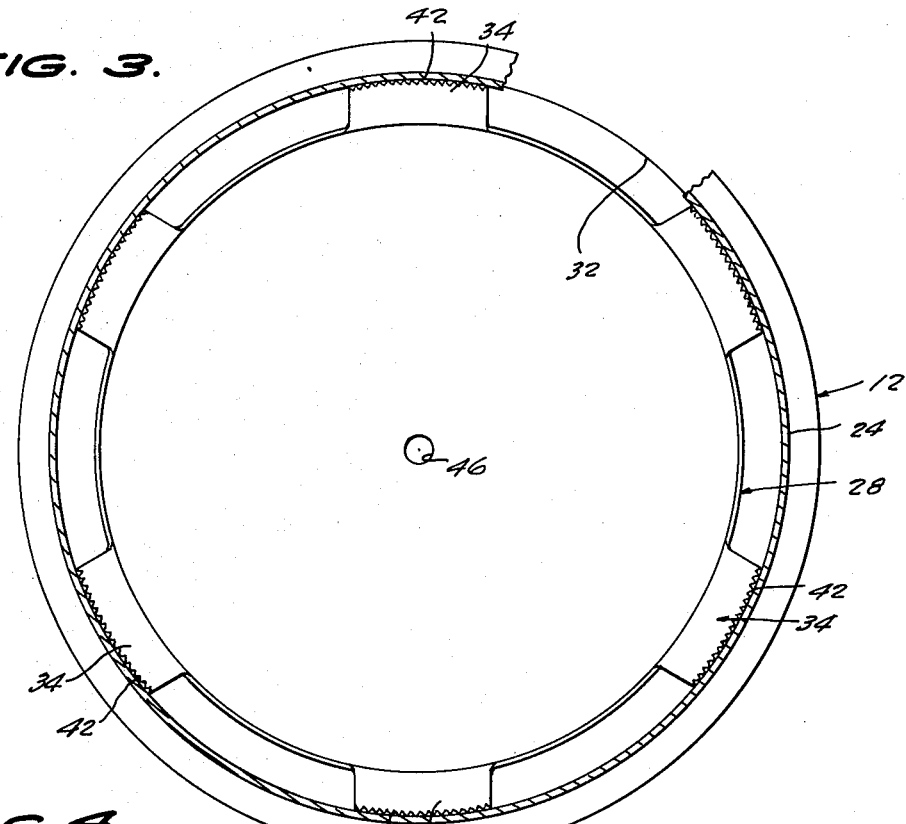
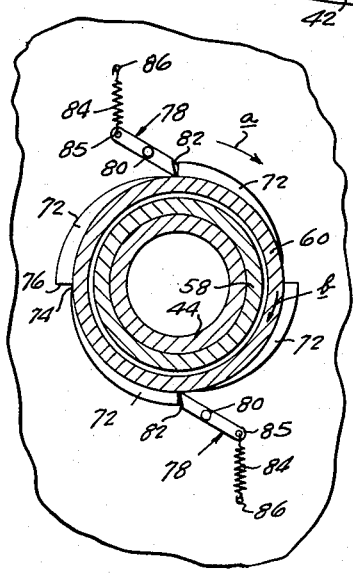
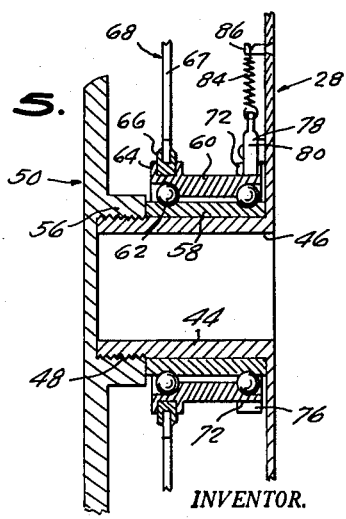
INVENTOR.
CHARLES W. UPCHURCH,
BY
McMorrow, Berman + Davidson
ATTORNEYS.

3,158,946
SPINNING HUB CAP
Charles W. Upchurch, 3500 Edgebrook, Mesquite, Tex.
Filed May 25, 1962, Ser. No. 197,670
4 Claims. (Cl. 40—129)

This invention relates to a novel spinning hub cap for vehicle wheels.

The primary object of the invention is the provision of an attractive, attention holding hub cap of the kind indicated, which is adapted to be spun relative to a vehicle wheel on which it is mounted, as the vehicle wheel rolls forwardly, and to continue to spin after the vehicle wheel has been brought to a stop.

Another object of the invention is the provision of a hub cap of the character indicated above which when installed on a vehicle wheel, gives the appearance of a "custom" wire wheel, wherein the wire spokes are arranged tangentially relative to the center of the hub.

A further object of the invention is the provision, in a hub cap of the character indicated above, of novel free-wheeling means, acting between a relatively stationary component and a revolving component of the hub cap, which serves to connect the hub cap to be rotated by a vehicle wheel on which it is mounted, and to free the revolving component to continue to revolve after the vehicle wheel has been stopped.

Other important objects and advantageous features of the invention will be apparent from the following description and the accompanying drawings, wherein, for purposes of illustration only, a specific form of the invention is set forth in detail.

In the drawings:

FIGURE 1 is an outboard side elevation showing a hub cap of the present invention installed on a vehicle wheel;

FIGURE 2 is a transverse section taken on the line 2—2 of FIGURE 1;

FIGURE 3 is a longitudinal section taken on the line 3—3 of FIGURE 2;

FIGURE 4 is a longitudinal section taken on the line 4—4 of FIGURE 2, showing the ratchet dogs engaged with the ratchet teeth; and, FIGURE 5 is an enlarged fragmentary transverse section taken on the line 5—5 of FIGURE 1.

Referring in detail to the drawings, wherein like numerals designate like parts throughout the several views, the numeral 10 generally designates a vehicle wheel having a drop-center rim 12, a wheel disc 14 having a central opening 16 through which an axle hub 18 extends from a mounting disc 20 on the hub, to which the wheel disc 14 is bolted, as indicated at 22. The rim 12 has, concentric with the hub 18, a cylindrical annular flange 24, which reaches outboardly beyond the wheel disc 14.

A spinning hub cap, generally designated 26, is positioned within the flange 24, and comprises a relatively stationary component, in the form of a circular metal disc 28, whose center is dished toward the vehicle wheel, as indicated at 30. The diameter of the disc 28 is substantially the same as the rim flange 24, and has a peripheral edge 32 on which are a plurality of equally circumferentially spaced spring jaws 34.

As shown in FIGURE 2, the jaws 34 are formed on the peripheral edge 32 of the disc 28 and extend chordally thereof. The jaws 34 comprise radially outwardly opening channels having concave arcuate bight portions 36, and outboard and inboard side walls 38 and 40, respectively, the jaws being positioned at the inboard side of the disc 28 and radially inwardly of the peripheral edge 32, with the outer edges of their outboard side walls 38 fixed to the disc 28, at its peripheral edge. The free edges of the inboard side walls 40 are formed with teeth 42 extending therealong, which bite into the inward surface of the wheel rim flange 24 and hold the hub cap 26 in place and against rotation relative to the vehicle wheel 10, with the dished center of the disc 28 spaced from the hub 18.

At the center of the disc 28 is an outboardly extending axial tube 44, which is registered with an opening 46 in the disc 28, which is externally threaded, at its outboard end, as indicated at 48. The tube 44 reaches beyond any part of the disc 28. A spinner 50, involves a disc 52 having chordal arms 54 extending radially therefrom, and an internally threaded axial tubular boss 56, which is threaded on the outer end of the tube 44.

An anti-friction bearing surrounds the tube 44 in the space between the boss 56 of the spinner 50 and the disc 28, and comprises an inner race 58, which is circumposed on the tube 44, and which is surrounded by an outer race 60, with ball bearings 62, interposed between the races. The tube 44 has, at its outboard end, an external channel 64 in which an inner ring 66 of a wire spoke assembly or rotor 68 is non-rotatably seated, to which a plurality of wire-wheel spokes 67 are individually secured, at their radially inward ends, in tangential relation to the ring, and an outer ring 70 is fixed to the outer ends of the spokes 67. The outer ring 70 is somewhat smaller in diameter than the disc 28, and is positioned close to the outboard side of the disc 28, the wire wheel assembly 68 being rotatable on the tube 44, relative to the vehicle wheel 10.

The outer bearing race 60 is surrounded, at its inboard end, by a circle of equally circumferentially spaced fixed rounded and tapered cams 72, which taper from leading ends 74 to trailing ends 76. The trailing ends 74 are normal to the tube 44 and serve as stationary ratchet tooth stops. A pair of diametrically opposed ratchet dogs 78 are pivoted intermediate their ends, on the outboard side of the disc 28, as indicated at 80, and have bevelled inner ends 82. Coil springs 84 are connected, at one end, as indicated at 84, to the outer ends of the dogs 78 and are anchored to the disc 28, at their outer ends, as indicated at 86, so that the dogs are biased to hold their inner ends 82 against the outer edges of the cams 72, and to force the inner ends of the dogs inwardly into engagement with the trailing ends or tooth stops 76, so as to connect the wire spoke assembly and the tube 44 for rotation with the vehicle wheel 10.

In operation, when the vehicle wheel 10 rolls forwardly, the disc 28, and hence the ratchet dogs 78 are rotated in the same direction, indicated by the arrow "a," so that the inner ends of the dogs engage the stops 76 and produce rotation of the wire wheel assembly and outer bearing race 60, relative to the tube 44. As the forward rotation of the wheel 10 is reduced or stopped, the momentum of the spoke assembly and the outer bearing race 60 causes the same to over-run or free-wheel relative to the disc 28 and the inner bearing race, so that the outer edges of the cams 72 engage the inner ends 82 of the ratchet dogs 78 and cam the dogs outwardly, so that dogs trip over the cam stops 76 and enable the wire spoke assembly 68 to continue rotating relative to the wheel 10, as indicated by the arrow "b" in FIGURE 4, until its momentum has been spent.

As shown in FIGURE 1, the disc 28 has an opening 88, located radially outwardly from the outer ring 70 of the wire spoke assembly 68, for the reception of the tire inflating valve (not shown) of a tire (not shown) mounted on the wheel rim 12.

Although there has been shown and described a preferred form of the invention, it is to be understood that the invention is not necessarily confined thereto, and that any change or changes in the structure of and in the relative arrangements of components thereof are contemplated

What is claimed is:

1. A spining hub cap comprising a disc adapted to be secured within the aperture at the outboard side of a wheel rim, an axial boss extending from the outboard side of the disc, a spinner threaded onto the outer end of the boss, said spinner being larger in diameter than the boss, said spinner being spaced from the disc and defining an annular channel around the boss between the spinner and the disc, an annular bearing surrounding the boss and having an inner race seated in said channel, said bearing having an outer race, a rotor surrounding and fixed to said outer race, said rotor being spaced from the outboard side of the disc, said outer race having circumferentially spaced ratchet cams located between the rotor and the disc, and spring-pressed ratchet dog means mounted on the disc and engaged with the cams, the ratchet cams and the dogs being concealed by said spinner.

2. A spinning hub cap comprising a disc having means for its securement to the outboard side of a vehicle wheel, an axial cylindrical boss fixed to and extending outwardly from the disc, a spinner having a tubular portion secured over the outer end of the boss, said tubular portion being larger in diameter than the boss and having an inner end spaced from the disc and defining an annular channel around the boss between said inner end of the tubular portion and the disc, an annular bearing comprising inner and outer races, said inner race being non-rotatably seated in said channel, a rotor surrounding and fixed to said outer race and spaced outwardly from the disc.

3. A spinning hub cap according to claim 2, wherein said outer bearing race has circumferentially spaced ratchet dogs thereon, and spring-pressed ratchet pawl means pivoted on the outboard side of the disc and engaged with the ratchet dogs.

4. A spinning hub cap according to claim 2, wherein said inner race has an outboard end and the inner end of said tubular portion of the spinner bears retainably against the outboard end of the inner race.

References Cited in the file of this patent

UNITED STATES PATENTS

| | | |
|---|---|---|
| D. 170,235 | Plotkin | Aug. 18, 1953 |
| 1,090,444 | Barnard | Mar. 17, 1914 |
| 2,657,099 | Judd | Oct. 27, 1953 |
| 2,762,469 | Lyon | Sept. 11, 1956 |
| 2,954,629 | Matin | Oct. 4, 1960 |
| 2,997,344 | Whiteman | Aug. 22, 1961 |

FOREIGN PATENTS

| | | |
|---|---|---|
| 265,414 | Great Britain | Feb. 10, 1927 |
| 508,296 | Canada | Dec. 21, 1954 |